US008408238B1

(12) United States Patent
Anderson

(10) Patent No.: US 8,408,238 B1
(45) Date of Patent: Apr. 2, 2013

(54) YARD HYDRANT WITH IMPROVED VALVE

(76) Inventor: Stephen J Anderson, Storm Lake, IA (US)

( * ) Notice: Subject to any disclaimer, the term of this patent is extended or adjusted under 35 U.S.C. 154(b) by 259 days.

(21) Appl. No.: 13/020,122

(22) Filed: Feb. 3, 2011

(51) Int. Cl.
*E03B 9/14* (2006.01)
(52) U.S. Cl. ........ 137/288; 137/292; 137/307; 251/279; 251/353
(58) Field of Classification Search .............. 137/272, 137/288, 292, 301, 302, 307; 251/279, 353
See application file for complete search history.

(56) References Cited

U.S. PATENT DOCUMENTS

| 3,523,549 | A |   | 8/1970 | Anderson |         |
|-----------|---|---|--------|----------|---------|
| 3,672,392 | A |   | 6/1972 | Anderson |         |
| 4,372,339 | A | * | 2/1983 | Anderson | 137/288 |
| 5,289,840 | A | * | 3/1994 | Anderson | 137/15.02 |
| 6,178,988 | B1| * | 1/2001 | Royle    | 137/288 |
| 6,899,120 | B1| * | 5/2005 | Motley   | 137/218 |
| 7,401,620 | B2| * | 7/2008 | Ball     | 137/301 |

* cited by examiner

*Primary Examiner* — Kevin Lee
(74) *Attorney, Agent, or Firm* — Sturm & Fix LLP

(57) ABSTRACT

A yard hydrant of a type utilizes a reciprocating valve for controlling the flow in a hydrant flow pipe vertically movable within a standpipe. The lower end of the flow pipe has a valve body attached thereto for controlling the flow of water from a supply of water under pressure. An upper end of the flow pipe is secured to the hydrant head and in flow communication therewith and such head is vertically movable with the flow pipe and valve body relative to the standpipe. The opening of the valve is accomplished by elevating the hydrant head with respect to the standpipe and the ground, which correspondingly elevates the flow pipe and valve body to the open position of the valve. Closing the valve is accomplished by lowering the hydrant head, flow pipe and valve body, which simultaneously allows water to drain from the hydrant head/flow pipe/valve.

7 Claims, 3 Drawing Sheets

Closed Position

Open Position

Open Valve

Closed Valve

YARD HYDRANT WITH IMPROVED VALVE

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to yard hydrants and more particularly to a valve for a hydrant structure which utilizes a movable spout head in place of a separate traditional type operating handle for opening and closing the flow of water through the hydrant head.

2. Description of the Prior Art

Hydrants have long been used in connection with water systems and much of the basic hydrant art appears to lie in the late 1800's and early 1900's. In such early art and even in later improvements it would appear that the hydrant device includes basically a fixed hydrant head for release of water with some suitable valve structure regulating the flow of water to the head and an appropriate operating handle for controlling the movement of the valve components. Such handle means frequently used a swingable type handle or a rotatable knob and various structures to control the volume of flow control though the valve and hydrant.

U.S. Pat. No. 3,523,549 to Noel Anderson shows a hydrant of the general type used in this invention using a reciprocating valve that is shut off when it is raised and turned on when it is lowered, water pressure biasing the valve to a closed position so that it will not continue to run if someone forgets to turn it off. U.S. Pat. No. 3,672,392 to Noel Anderson is similar to the '549 patent except that it primarily uses a different structure to move the hydrant head up to the closed position or down to the open position. U.S. Pat. No. 6,178,988 to Royle is similar to the two Anderson patents in that the hydrant head is moved up or down to control the flow but it uses a spool valve instead of the type of valve used in the Anderson patents and in Royle, when the hydrant head is up there is flow through the hydrant head and when the hydrant head is down the valve is shut off to high pressure but allowing the hydrant to drain to a level below the frost line to prevent freezing. All three of these aforementioned prior art devices use valves that reciprocate in a bore that is of a uniform diameter everywhere that the valve body moves therein to allow of the respective valve body to seal against the inside walls of the bore in the valve housing, thereby limiting the amount of flow through the respective valves at times when more flow is desired.

BRIEF SUMMARY OF THE INVENTION

The present invention utilizes a reciprocating valve for controlling the flow in a hydrant flow pipe vertically movable within a standpipe. The lower end of the flow pipe is provided with a novel valve for controlling the flow of water therethrough from a water supply under pressure. The upper end of the flow pipe is fixedly secured to the hydrant spout head and in flow communication therewith and such head is vertically movable with the flow pipe and valve relative to the standpipe. When the hydrant head is down, flow of water from a source of high pressure below the frost line is off. Contact of water under pressure with the valve will tend to bias the valve towards the open position with the flow pipe and hydrant head being elevated accordingly during the open position of the valve. Closing of the valve on the flow pipe for the passage of water to the hydrant head is accomplished by lowering the hydrant head with respect to the standpipe and the ground, which correspondingly lowers the flow pipe and valve body to the closed position while simultaneously allowing the water in the hydrant head, flow pipe and valve to drain to below the frost line to prevent freezing.

DETAILED DESCRIPTION OF THE INVENTION

Figure 1:
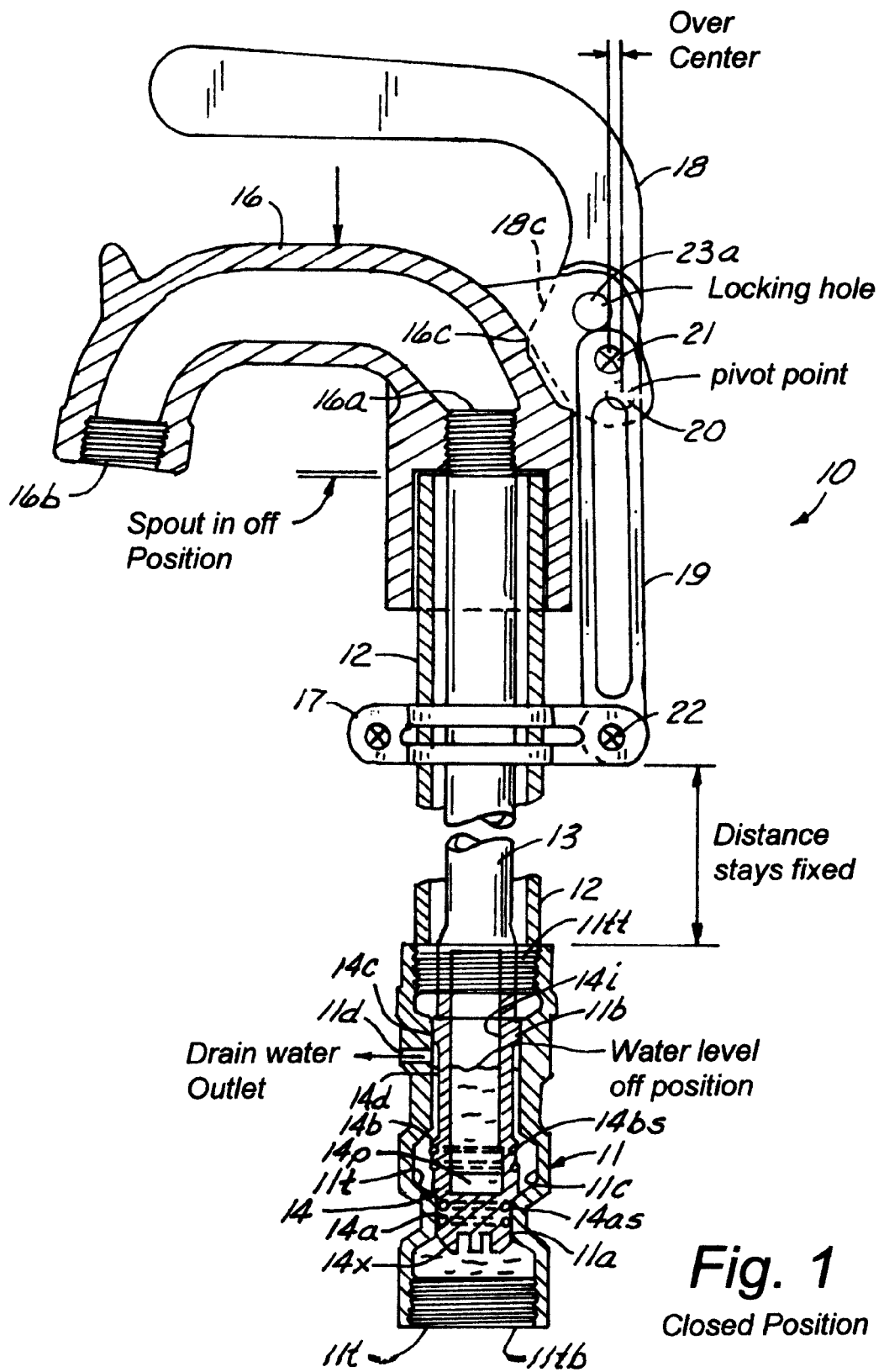
FIG. 1 is a partial cross sectional view of a yard hydrant constructed in accordance with the present invention, showing the yard hydrant in the closed position thereof.
Figure 2:
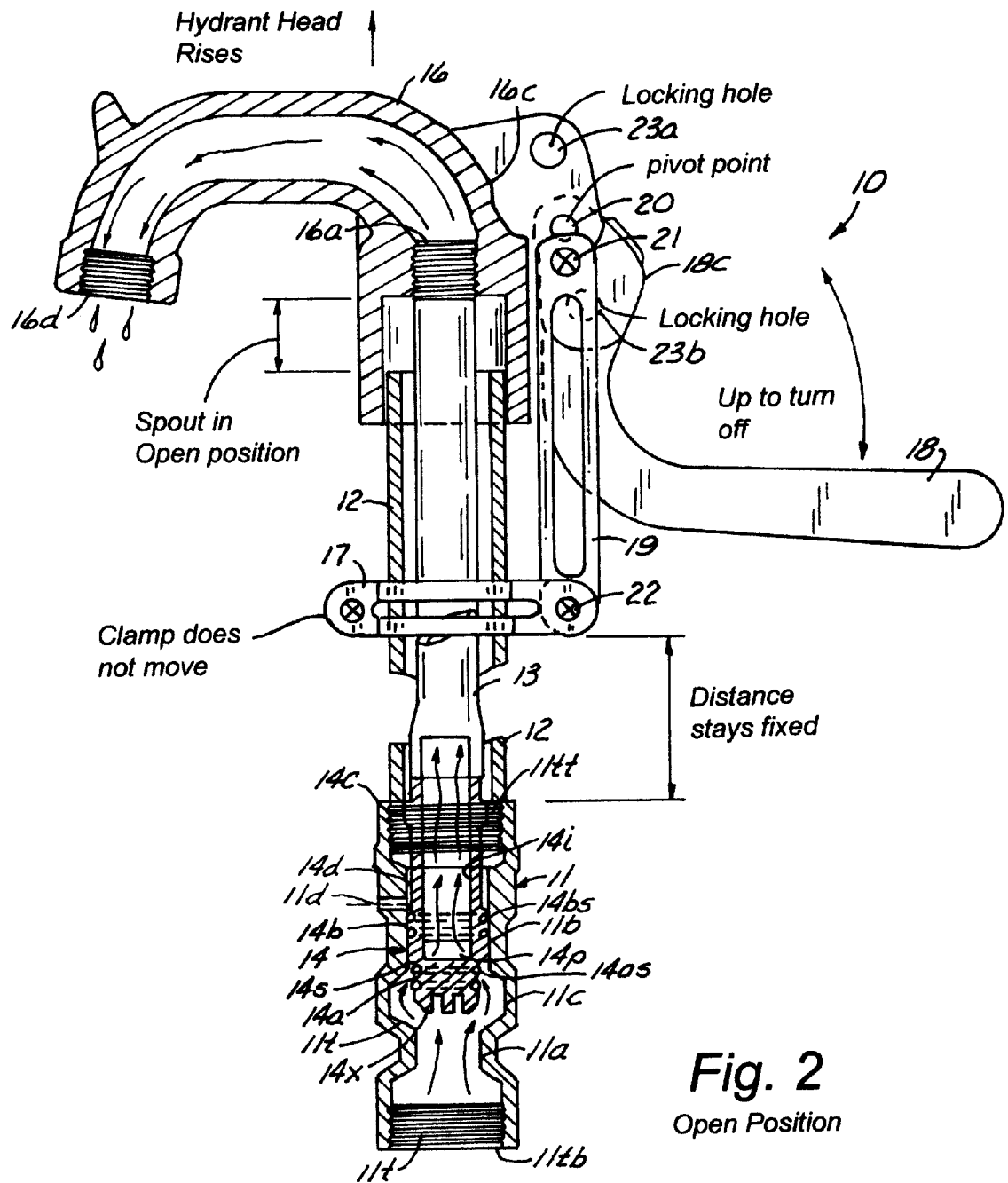
FIG. 2 is a partial cross sectional view of the yard hydrant of FIG. 1 of the present invention, but showing the yard hydrant in the open position thereof.

Referring now to the drawings, wherein like reference numerals designate identical or corresponding parts throughout the several views, FIGS. 1 and 2 show a yard hydrant 10 constructed in accordance with the present invention. A valve housing (11) adapted to be connected at one end to a source of fluid under pressure at the bottom threads (11tb).

A valve housing (11) has a first portion (11a) with a first inside diameter, a second portion (11b) with a second inside diameter that is larger than the first inside diameter (11a) and a third portion (11c) between the first and second portions with a third inside diameter that is larger than the second inside diameter.

Still looking at FIGS. 1 and 2, a standpipe (12) having an upper and lower end with the lower end secured to the other end of the valve housing (11) at the threaded top portion (11tt) of the valve housing (11). A flow pipe (13) is concentrically disposed within the standpipe (12) and is reciprocal therein.

A valve body (14) is disposed inside of the valve housing (11), the valve body (14) being closed at the bottom end (14x) thereof and having an open interior (14i) in fluid communication at all times with the flow pipe (13). The valve body (14) has a port (14p) in fluid communication at all times with an interior of the third inside portion (11c) of the valve housing (11). The valve body (14) has a first body portion (14a) with a first outside diameter that will fit in close sliding relationship with the first inside diameter of the first portion (11a) of the valve housing (11). A second body portion (14b) has a second outside body diameter that will fit in close sliding relationship with the second inside diameter of the second housing portion (11b) of the valve housing (11). Similarly, a third body portion (14c) that has approximately the same outside diameter as the second outside body diameter of the second body portion (14b) is provided so that the second (14b) and third (14c) body portions can slide in close sealing relationship with the second inside housing portion (11b). The valve body (14) also has a fourth body portion (14d)

located between the second (14b) and third (14c) body portions. This fourth body portion (14d) has an outside diameter which is less than the outside diameter of the second (14b) and third (14) body portions of the valve body (14).

The valve body (14) is operatively attached to one end of the flow pipe (13) and by selective reciprocation of the flow pipe (13) as shown in FIGS. 1 and 2. The valve body (14) has a closed position shown in FIG. 1 for preventing fluid communication between the source of fluid under pressure at threads (11t) and the flow pipe (13) when the first portion (14a) of the valve body (14) is in the first portion (11a) of the valve housing (11). FIG. 2 shows the valve body (14) in an open position when the first portion (14a) of the valve body (14) is raised out of the first portion (11a) of the valve housing (11) to the third portion (11c) of the valve housing (11) to permit fluid communication from the source of fluid pressure to enter the third portion (11c) of the valve housing. From there to the fluid flows through port (14p) in valve body (14), from there to the open interior of the valve body (14i), from there to the open interior of the valve body (14i) and then on to the flow pipe (13).

A hydrant head (16) operatively attached at one end thereof to the other end of the flow pipe (13) and in flow communication therewith. The hydrant head (16) has an outlet (16b) for directing flow from the flow pipe (13) from the hydrant inlet (16a) when the valve body (14) is in the open position thereof. The hydrant head (16) is slidably journalled on the upper end of the standpipe (12) as shown in FIGS. 1 and 2 so that movement of the hydrant head (16) in one direction acts to move the flow pipe (13) and valve body (14) to the open position to allow flow communication with the source of fluid under pressure as shown in FIG. 2 and movement of the hydrant head (16) in the opposite direction acting to move the flow pipe (13) and valve body (14) to the closed position of the valve body to prevent fluid communication with the source of fluid under pressure is shown in FIG. 1.

A drain port (11d) is in fluid communication with an inside part of the second portion (11b) of the valve housing (11) for permitting fluid communication between the inside of the valve housing (11) and the outside of the valve housing (11) when the valve body (14) is in the closed position of FIG. 1, thereby allowing fluid to drain from the hydrant head (16) and flow pipe (13) when the valve body (14) is closed. This is important to keep the water above the frost line from freezing in the wintertime.

A shoulder (14s) on the second portion (14b) of the valve body (14) is in contact with a top portion (11t) of the first portion of the valve body (14) when the valve body (14) is in the closed position shown in FIG. 1.

The first portion (14a) of the valve body (14) has two O-rings (14 as) in respective annular grooves for sealing against a surface of the inside diameter of the first portion (11a) of the valve housing (11). The second portion (14b) of the valve body (14) has two O-rings (14bs) in respective annular grooves for sealing against a surface of the inside diameter of the second portion (11b) of the valve housing (11).

Looking again at FIGS. 1 and 2, the yard hydrant (10) has a collar (17) rigidly fixed to the standpipe (12). A handle (18) is pivotally attached to the hydrant head (16) at pin (20). A link (19) is operatively pivotally attached at one end to a handle (18) at pin (21) and at another end thereof to the collar (17) at pin (22).

The handle (18) has a first pivotal position (FIG. 1) corresponding to the closed position of the valve body (14) and a second pivotal position (FIG. 2) corresponding to the open position of the valve body (14). The handle (18) has a surface (18c) which is, when the valve is closed, in abutment with a surface (16c) on the hydrant head (16) for holding the handle (18) in the closed position shown in FIG. 1 until the handle (18) is moved to the open position thereof as shown in FIG. 2. Moving the handle (18) from the open position shown in FIG. 2 to the closed position shown in FIG. 1 causes the over center condition shown in FIG. 1 to securely hold the handle (18) in the closed position until it is manually pivotally forced again towards the open position shown in FIG. 2.

Figure 5:
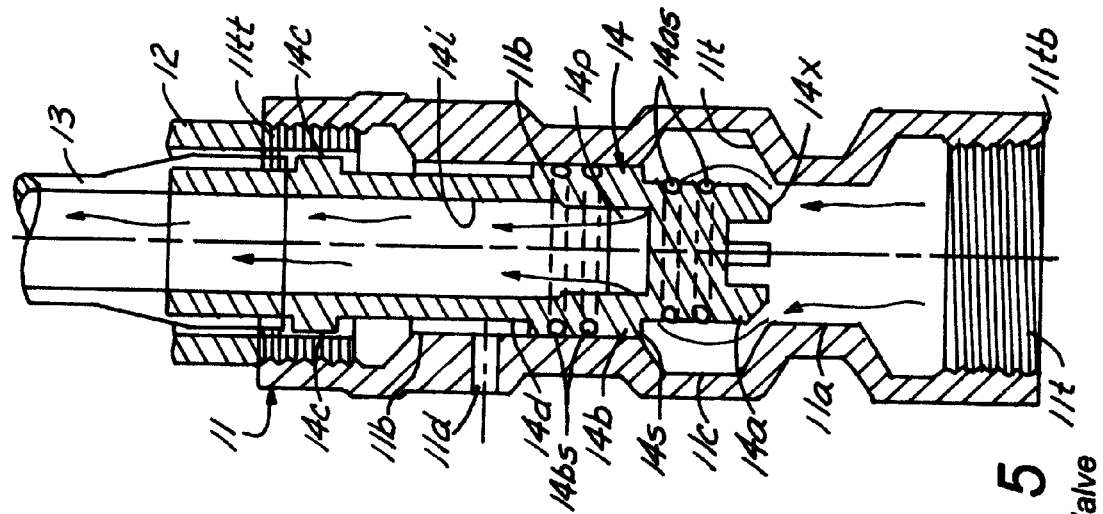
FIG. 5 is an enlarged cross sectional view of the valve portion of the present invention like that shown in FIG. 3 except that it is shown in the open position.
Figure 4:
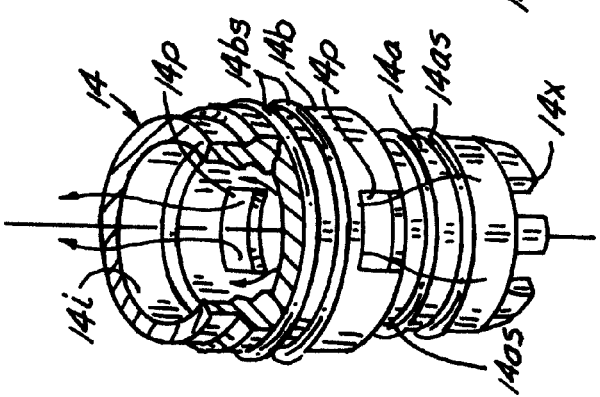
FIG. 4 is a perspective view of the valve body that reciprocates inside of the valve housing shown in FIGS. 1-3 and 5.
Figure 3:
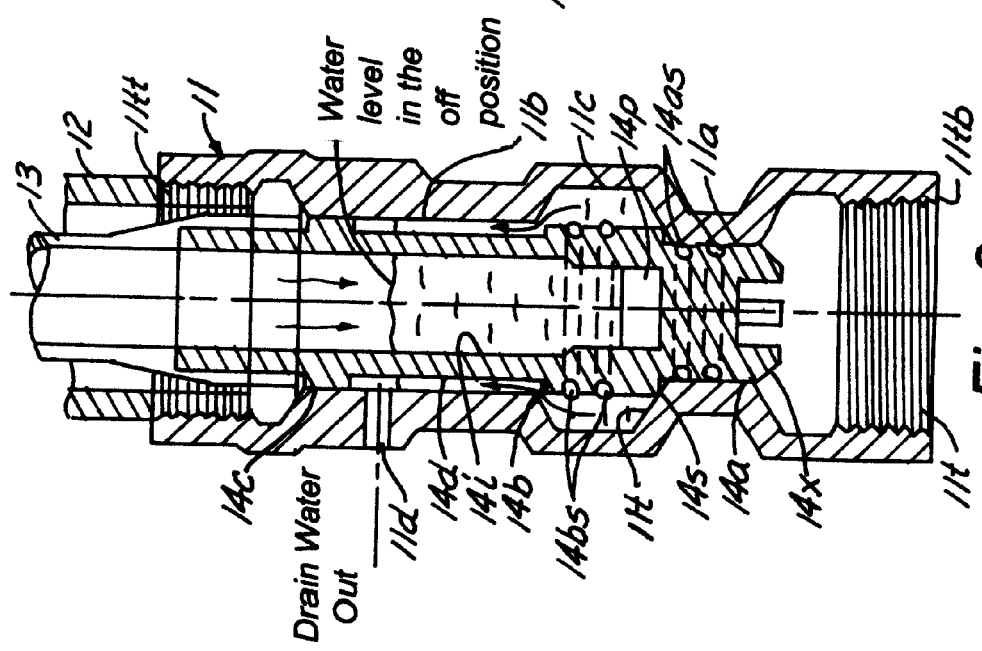
FIG. 3 is an enlarged cross sectional view of the valve portion of the present invention in the closed position thereof.

Arrows shown in FIGS. 2 and 5 illustrate the flow of fluid such as water when the valve body (14) is in the raised/open position and the arrows in FIGS. 1 and 3 show the closed position of the valve but still allowing drainage of water from the hydrant head (16), flow pipe (13) and valve body (14) out through the drain hole (11d) to keep the hydrant from freezing in the wintertime when the hydrant is installed such that the valve housing (11) is in the ground below the frost line.

In FIGS. 1 and 2 a locking hole (23a) in the hydrant head (16) aligns with a locking hole (23b) in the handle (18) in the closed position of FIG. 1, to permit a padlock or the like to pass through the aligned locking holes (23a) and (23b) if desired.

Obviously many modifications and variations of the present invention are possible in light of the above teachings. It is therefore to be understood that, within the scope of the appended claims, the invention may be practiced otherwise than as specifically described.

The invention claimed is:

1. A yard hydrant, comprising:
a valve housing adapted to be connected at one end to a source of fluid under pressure, the valve housing having a first portion with a first inside diameter, a second portion with a second inside diameter that is larger than the first inside diameter and a third portion between the first and second portions with a third inside diameter that is larger than the second inside diameter;
a standpipe having an upper and lower end with the lower end secured to the other end of the valve housing;
a flow pipe is concentrically disposed within the standpipe and is reciprocal therein;
a valve body is disposed in the valve housing, the valve body being closed at the bottom end thereof and having an open interior in fluid communication at all times with the flow pipe and having a port in fluid communication at all times with an interior of the third inside portion of the valve housing, the valve body having a first body portion with a first outside diameter that will fit in close sliding relationship with the first inside diameter of the first portion of the valve housing, a second body portion with a second outside body diameter that will fit in close sliding relationship with the second inside diameter of the second housing portion of the valve housing and a third body portion that has approximately the same outside diameter as the second outside body diameter of the second body portion so that the second and third body portions can slide in close sealing relationship with the second inside housing portion, the valve body having a fourth body portion between the second and third body portions which fourth body portion has an outside diameter which is less than the outside diameter of the second and third body portions of the valve body, the valve body being operatively attached to one end of the flow pipe and by selective reciprocation of the flow pipe the valve body having a closed position for preventing fluid communication between the source of fluid under pressure and the flow pipe when the first portion of the valve body is in the first portion of the valve housing, and an open position when the first portion of the valve body is raised out of the first portion of the valve housing to the third portion of the valve housing to permit fluid communication from the source of fluid pressure to enter the third portion of the valve housing, from there to the port in valve body and from there to the open interior of the valve body and from the open interior of the valve body to the flow pipe;

a hydrant head operatively attached at one end thereof to the other end of the flow pipe and in flow communication therewith, the hydrant head having an outlet for directing flow from the flow pipe from the hydrant inlet when the valve body is in the open position thereof, the hydrant head being operably slidably journalled on the upper end of the standpipe, movement of the hydrant head in one direction acting to move the flow pipe and valve body to the open position to allow flow communication with the source of fluid under pressure and movement of the hydrant head in the opposite direction acting to move the flow pipe and valve body to the closed position of the valve body to prevent fluid communication with the source of fluid under pressure; and a drain port in fluid communication with an inside part of the second portion of the valve housing for permitting fluid communication between the inside of the valve housing and the outside of the valve housing when the valve body is in the closed position thereof for allowing fluid to drain from the hydrant head and flow pipe when the valve body is closed.

2. The yard hydrant of claim 1 wherein a shoulder on the second portion of the valve body is in contact with a top portion of the first portion of the valve body when the valve body is in the closed position thereof.

3. The yard hydrant of claim 1 wherein the first portion of the valve body has at least one O-ring thereon for sealing against a surface of the inside diameter of the first portion of the valve housing.

4. The yard hydrant of claim 3 wherein the second portion of the valve body has at least one O-ring thereon for sealing against a surface of the inside diameter of the second portion of the valve housing.

5. The yard hydrant of claim 1 wherein the second portion of the valve body has at least one O-ring thereon for sealing against a surface of the inside diameter of the second portion of the valve housing.

6. The yard hydrant of claim 1 wherein a collar is rigidly fixed to the standpipe, a handle is pivotally attached to the hydrant head, a link is operatively pivotally attached at one end to the handle and at another end thereof to the collar, the handle having a first pivotal position corresponding to the closed position of the valve body and a second pivotal position corresponding to the open position of the valve body.

7. The yard hydrant of claim 6 wherein the handle has a cam surface which is in abutment with a cam surface on the hydrant head for holding the handle in the closed position until the handle is moved to the open position thereof.

* * * * *

UNITED STATES PATENT AND TRADEMARK OFFICE
CERTIFICATE OF CORRECTION

| | |
|---|---|
| PATENT NO. | : 8,408,238 B1 |
| APPLICATION NO. | : 13/020122 |
| DATED | : April 2, 2013 |
| INVENTOR(S) | : Stephen J. Anderson |

It is certified that error appears in the above-identified patent and that said Letters Patent is hereby corrected as shown below:

Title Page, insert

--(73) Assignee:     MERRILL MANUFACTURING COMPANY
                     Storm Lake, IA USA--

Signed and Sealed this
Twenty-third Day of April, 2013

Teresa Stanek Rea
*Acting Director of the United States Patent and Trademark Office*